United States Patent Office 3,225,075
Patented Dec. 21, 1965

3,225,075
METHOD OF PRODUCING BASIC CADMIUM
SALTS OF ALIPHATIC CARBOXYLIC ACIDS
John G. Hendricks, Boonton, N.J., and Leonard M. Kebrich, Ridgewood, N.Y., assignors to National Lead Company, New York, N.Y., a corporation of Delaware
No Drawing. Filed July 25, 1960, Ser. No. 44,903
6 Claims. (Cl. 260—414)

This application is a continuation-in-part of Serial No. 613,833, filed October 4, 1956, now abandoned, said application being a continuation-in-part of Serial No. 365,246, filed June 30, 1953, now abandoned.

This invention relates to the production of basic cadmium salts of aliphatic carboxylic acids and to vinyl resin compositions stabilized by basic cadmium salts of aliphatic carboxylic acids.

Vinyl resin compositions are known to be sensitive to the action of light and heat. It is also known that the acid degradation products produced by such action react to effect deterioration of the resin composition. This deterioration, primarily evidenced by color changes in the resin compositions, which are in themselves undesirable, also seriously affects other physical characteristics of the resins such as flexibility and tensile strength. Since the resin compositions are necessarily exposed to heat during compounding and processing, and to light during ordinary use, it is desirable to incorporate agents which tend to stabilize the physical properties of the resin composition.

Cadmium salts of aliphatic carboxylic acids have heretofore been employed as stabilizers for vinyl resin compositions. The cadmium salt stabilizers are particularly valuable because they impart clarity to the resin compositions as well as stabilization properties. Their employment has therefore been indicated where clarity is desired in the finished product. Such a requirement excludes the use of stabilizers which tend to produce translucent or opaque products but embody other desirable characteristics, for example the lead stabilizers.

The widespread use of vinyl resins for electrical insulation purposes has given rise to still another requirement for stabilizers intended for use in this type of application. Such a stabilizer should not, of itself, impair the electrical resistivity of the resin composition. Moreover, it should be of such a nature that it overcomes the effects on resistivity of electrolytes (e.g., HCl) generated in the course of degradation of the resin, and does not react, in the process, to produce compounds which have untoward effects on electrical resistivity. From this point of view, the heretofore known cadmium stabilizers are unsatisfactory, because although they react with HCl, thus retarding the degradation process and impart excellent clarity to the vinyl resin compositions, they react to produce metallic compounds which are disadvantageous from the electrical viewpoint.

An object of this invention, therefore, is to provide novel and improved stabilizing agents for vinyl resins. Another object of this invention is to provide vinyl halide resin compositions stabilized against the effects of light and heat. Another object is to provide such compositions, which also possess high electrical resistivity. Another object is to provide stabilized vinyl halide resin compositions of high electrical resistivity, in which the stabilizer is substantially free of electrolyte. Still another object is to provide a process to produce a stabilizer that will possess high electrical resistivity. Other objects and advantages will be come apparent from the following more complete description and claims.

This invention, in its broadest aspects, contemplates a method of producing a basic cadmium compound which comprises mixing a cadmium compound selected from the group consisting of cadmium oxide and cadmium hydroxide and an aliphatic carboxylic acid in an aqueous medium and mixing the same until the cadmium compound and the aliphatic carboxylic acid are chemically combined. This invention further contemplates a method of producing a basic cadmium compound which comprises mixing a cadmium compound selected from the group consisting of cadmium oxide and cadmium hydroxide, and an aliphatic carboxylic acid in an aqueous medium containing a water soluble organic compound selected from the group consisting of alcohols and ethers, and mixing the same until the cadmium compound and aliphatic carboxylic acid are chemically combined. This invention also contemplates a vinyl halide composition containing, as stabilizer therefor, a basic cadmium compound corresponding to the formula

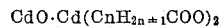

where $n$ is an integer from 3 to 21, said cadmium compound being substantially free of electrolyte.

Unexpectedly, it has been found that the basic cadmium aliphatic carboxylates when prepared as herein described, result in extraordinary electrical resistivity heretofore unattainable with organic cadmium salts. Since a basic cadmium aliphatic carboxylate by itself contributes a degree of heat and light stabilization, it may be used alone or if it is desired, in conjunction with other metal salt or organic stabilizers, such as alkaline earth metal salts, and phenolic compounds, epoxides, polyols, etc.

The basic cadmium carboxylates, as has been mentioned above, stabilize the vinyl resin composition against heat and light, but the exact mechanism by which the electrical resistivity of the composition is maintained is not obvious at the present time. The reaction products formed in the instant invention do not have untoward effects on electrical properties, as is the case in the conventional normal cadmium salt stabilizers.

Basic cadmium carboxylates, prepared by metathesis according to the following equation:

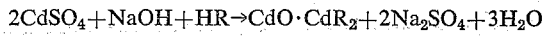

have heretofore been employed in vinyl compositions. As stabilizers, they are highly beneficial in regards to clarity and resistance to discoloration. However, because of the preparation process and type of reactions, small amounts of electrolytic material remain in the product which prohibits their use as electrical grade stabilizers.

A novel process and reaction has been found wherein we are able to prepare basic cadmium carboxylates that are electrolyte free, thereby producing a stabilizer that possesses excellent electrical characteristics along with the above mentioned properties, in an aqueous medium.

The basic cadmium compounds suitable for use as stabilizing agents correspond to the formula:

where $n$ represents an integer from 3 to 21. Monobasic cadmium caprate having the formula

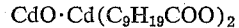

is the preferred stabilizer because it contributes a highly beneficial combination of properties to the vinyl resin products, namely high electrical resistivity, clarity, heat and light stability.

Other stabilizers, that we may mention, found to be effective in regards to their high electrical resistivity characteristics are: Monobasic cadmium valerate, monobasic cadmium behenate, monobasic cadmium crotonate and monobasic cadmium oleate. Other acids capable of reacting to form basic cadmium salts are butyric, caproic, caprylic, lauric, myristic, stearic and palmitic. In general, the acids that are useful in this invention are those containing from 4 to 22 carbon atoms in a saturated or unsaturated carbon chain.

It is preferred to add the basic cadmium aliphatic carboxylate to the resin batch on the initial mixing of the ingredients, but it may also be introduced at any stage of manufacture. The basic cadmium aliphatic carboxylate disperses readily in vinyl resin or vinyl resin compositions containing other compounding agents so that uniformity is easily obtained. As other compounding agents we mention plasticizers, such as dioctyl phthalate; electrical grade clays; fillers and coloring agents. The vinyl resin compositions may, after a blending operation, be processed at wide ranges of temperature, dependent upon, for instance, the molecular weight of the resin, the actual process involved, the formulation of the resin composition, etc. The compositions used in the examples were weighed, mixed, processed on a two roll mill at a temperature of 315° F. and sheeted in a 4 minute cycle. Samples of these sheets were then tested for heat stability and volume resistivity. The effectiveness of this invention is independent of the method or process employed in producing objects or items, those operations including milling, calendering, molding, extruding, etc.

Basic cadmium compounds to provide the desired beneficial effects should be present in the amount of from 0.01% to 5% by weight based on the resin. Amounts lower than 0.01% have limited stabilizing action whereas amounts in excess of 5% do not serve any additional stabilizing purpose. The desired results can normally be attained by using amounts of a basic cadmium compound totaling between 0.05% and 3.0% based on the weight of the vinyl resin.

The basic cadmium compounds having the formula $CdO \cdot Cd(C_nH_{2n \pm 1}COO)_2$, where $n$ is an integer from 3 to 21, and possessing the above mentioned stabilizing properties, and in particular high electrical resistivity, can be prepared by neutralization in an aqueous system illustrated by this type of reaction, $$2CdO + XH_2O + 2HR \rightarrow CdO \cdot CdR_2 + (X+1)H_2O$$

where R represents the aliphatic acid radical and X represents the number of molecules of water involved in the reaction.

In place of cadmium oxide, cadmium hydroxide may be substituted. The mole ratio of acid to base is not limited to 2:2 and generally satisfactory stabilization can be attained using combinations of normal and basic cadmium carboxylates in which this ratio may be, for example, 2:1.5.

The process is best conducted in a heated pebble mill, at a temperature of between 30° C. and 100° C., in an aqueous medium and may contain a small amount of a water soluble alcohol, glycol ether or the like, e.g. secondary butanol, isobutanol or ethylene glycol monobutyl ether. The water soluble organic compound seems to catalyze the neutralization and form workable dispersions of the water-repellent product.

Attempts to duplicate the aforementioned results, namely, electrical resistance, by other methods of preparation, i.e., reaction of cadmium sulfate, sodium hydroxide and the designated acid, have not been successful because complete removal of the sodium sulfate formed was not possible even after repeated washings with water. Small amounts of sodium sulfate seriously reduce the effectiveness of the basic cadmium carboxylates as stabilizers in electrical applications.

In order to illustrate more fully the nature of this invention and the manner of practicing the same, the following examples are presented.

The following example is typical of the preparation of the monobasic cadmium compounds.

*Example I.—Monobasic cadmium caprylate*

51.4 grams (0.40 mol) of cadmium oxide and 57.7 grams (0.40 mol) of caprylic acid were reacted in a solution of 300 ml. of water and 25 ml. of isobutanol.

The reaction was conducted at 35° C.±5° C. for 24 hours in a porcelain pebble mill.

The white product, which after filtration and drying weighed 103.9 grams, was found to be a single phase solid having an average refractive index of 1.56 and a density of 1.70.

*Example II*

Two vinyl halide resin compositions, see Table I, were weighed, mixed, heated on a two roll mill at a temperature of 315° F. and milled for 3 minutes until substantially uniform. The compositions were then sheeted into 20 mil sheets. Composition 1, containing monobasic cadmium caprate prepared as in Example I and Composition 2, containing monobasic cadmium caprate prepared by a metathesis reaction that was repeatedly washed to remove, as much as possible, the sodium sulfate remaining in the product, were evaluated for volume resistivity according to the following procedure. The composition having a thickness of 20 mils was coated with colloidal graphite to insure intimate contact between the specimen and the electrode. The specimen after coating is carefully preconditioned to a temperature of 70° C. for 30 minutes after which time the specimen is placed between 2 standard electrodes. An applied voltage of 500 volts D.C., is applied, and after an electrification period of 1 minute the electrical resistivity is measured using a megohmmeter. From this data volume resistivity in ohm-cm. may be calculated. Typical analysis shows that the basic cadmium salt contained 0.005% sodium when prepared in a pebble mill and greater than 0.045% sodium when prepared by metathesis with repeated washings. Table I shows the plastic formulations and the results of volume resistivity measured at a temperature of 70° C.

TABLE I

| Component | Composition 1, parts by weight | Composition 2, parts by weight |
|---|---|---|
| Geon 101 (polyvinylchloride resin) | 100 | 100 |
| DOP (dioctyl phthalate) | 50 | 50 |
| Electrical grade clay | 5 | 5 |
| Barium caprate | 1.0 | 1.0 |
| Bisphenol A | .02 | .02 |
| Monobasic cadmium caprate (pebble mill) | 1.0 | |
| Monobasic cadmium caprate (metathesis) | | 1.0 |
| Volume resistivity, 70°C., $10^{12}$ ohm-cm | 15.0 | 3.0 |

Composition 1 was by far superior to composition 2 with a volume resistivity of $15 \times 10^{12}$ ohm-cm. as compared to $3.0 \times 10^{12}$ ohm-cm. Composition 1 was compared also to a commercial electrical lead stabilizer. The results showed composition 1 to be at least equal in volume resistivity and superior in heat stability.

*Example III*

To a 1 quart pebble mill the following materials were added: 300 ml. of water, 25 ml. of isobutanol, 23.43 grams of valeric acid and 28.97 grams of cadmium oxide.

The reaction was conducted at 35° C. for a period of 64 hours. The product, monobasic cadmium valerate, was then filtered and dried. The yield was 49.4 grams.

*Example IV*

To a 1 quart pebble mill the following materials were added: 200 ml. of water, 1 ml. of bis(2-ethylhexyl) sodium sulfo succinate, 7 ml. of 1% acetic acid, 25 ml. of butyl Cellosolve, 36.58 grams of behenic acid and 14.58 grams of cadmium oxide.

The reaction was conducted at 45–50° C. for a period of 67 hours. The product, monobasic cadmium behenate was then filtered and dried. The yield was 50.5 grams.

*Example V*

To a 1 quart pebble mill the following materials were added: 150 ml. of water, 31.24 grams of cadmium oxide, and 21.14 grams of crotonic acid.

The reaction was conducted at 25° C. for 40 hours. The product, monobasic cadmium crotonate, was then filtered and dried. The yield was 49.1 grams.

*Example VI*

To a 1 quart pebble mill the following materials were added: 200 ml. of water, 34.96 grams of oleic acid, 16.17 grams of cadmium oxide, 8 ml. of 1% acetic acid and 25 ml. of butyl Cellosolve.

The reaction was conducted at 50° C. for 168 hours. The product, monobasic cadmium oleate was then filtered and dried. The yield was 51 grams.

*Example VII*

The basic cadmium salts of Examples III, IV, and V were compared to monobasic cadmium caprate (as in Example II) made by metathesis for heat stability and volume resistivity. The vinyl resin compositions consisted of 100 parts of polyvinyl chloride resin, 50 parts of DOP, 0.3 part barium caprate and 0.07 bisphenol A. The cadmium salt level in all compositions was 0.3 part. Heat stability was evaluated at 375° F. on 40 mil samples. All of the compositions were substantially equal in heat stability. Volume resistivity was determined in the same manner as in Example II. The results are as follows: monobasic cadmium caprate $0.6 \times 10^{12}$ ohm-cm; monobasic cadmium crotonate $1.5 \times 10^{12}$ ohm-cm.; monobasic cadmium valerate $1.4 \times 10^{12}$ ohm-cm.; and monobasic cadmium behenate $1.7 \times 10^{12}$ ohm-cm.

The following salts were prepared in order to determine the maximum allowable concentration of electrolyte, namely the amount of sodium that is tolerable, when used in an electrical grade stabilizer according to the present invention.

*Example VIII*

To a 1 quart pebble mill the following materials were added: 200 ml. of distilled water, 25 ml. of isobutanol, 29.64 grams of capric acid and 21.90 grams of cadmium oxide.

The reaction was conducted at a temperature of 45–50° C. and was complete after milling 96 hours. The slurry, containing the product, monobasic cadmium caprate, was evaporated to dryness at 85° C. over a period of 18 hours, and then hammer-milled into a very fine unctious powder. The yield was 51.2 grams and had a percent sodium by analysis of 0.002%.

*Example IX*

Example VIII was repeated. The yield was 50.3 grams and a sodium content of 0.005% by analysis.

*Example X*

To a 1 quart pebble mill, the following materials were added: 200 ml. of distilled water, 25 ml. of isobutanol, 1.25 ml. of .1 N sodium hydroxide, 29.64 grams of capric acid, 21.90 grams of cadmium oxide and 2 ml. of 1% acetic acid.

The reaction was conducted at a temperature of 45–50° C. and was complete after milling for 48 hours. The slurry containing the product, monobasic cadmium caprate, was evaporated to dryness using a temperature of 85° C. over a period of 18 hours and then hammer-milled into a very fine unctious powder. The yield was 50.5 grams and had an actual sodium content, by analysis, of 0.01%.

*Example XI*

To a 1 quart pebble mill, the following materials were added: 200 ml. of distilled water, 25 ml. of isobutanol, 0.13 ml. of .1 N sodium hydroxide, 29.64 grams of capric acid, 21.90 grams of cadmium oxide and 2 ml. of 1% acetic acid.

The reaction was conducted at a temperature of 45–50° C. and was complete after milling for 100 hours. The slurry containing the product, monobasic cadmium caprate, was evaporated to dryness at 85° C. over a period of 18 hours, and then hammer-milled into a very fine powder. The yield was 52.3 grams and had an actual sodium content, by analysis, of 0.02%.

*Example XII*

The procedure employed in Example XI was repeated except that 21.8 ml. of .1 N sodium hydroxide was added to the charge.

The reaction was complete after 44 hours and the dry powder yield was 51.5 grams. The percent sodium, by analysis was 0.04%.

*Example XIII*

The basic cadmium salts of Examples VIII through XII were compared to monobasic cadmium caprate prepared by metathesis with a sodium content of 0.06%, for volume resistivity in a vinyl resin formulation. The vinyl resin formulations consisted of 100 parts of polyvinylchloride resin, 50 parts of DOP, 0.30 part of barium caprate, .275 part of a vinylchloride-vinyl acetate copolymer, 0.05 part dipropylene glycol, 0.065 part epoxy plasticizer, 0.015 part of bisphenol A, 0.03 part of 2-hydroxy-4-methoxy benzophenone, 0.25 part of octyl epoxy stearate, 0.09 part of butyl Cellosolve and 0.615 part of mineral spirits. Separate compositions were prepared by adding 0.310 part of monobasic cadmium caprate, varying in percent Na, to portions of this formulation. These compositions were then treated according to the procedure outlined in Example II and a summary of the volume resistivity measurements can be found in Table II.

TABLE II.—ELECTRICAL PROPERTIES OF PLASTICS CONTAINING SODIUM

| Composition | Percent sodium in monobasic cadmium salt | Volume resistivity 70° C., $10^{12}$ ohm-cms. |
|---|---|---|
| A | 0.002 | 2.6 |
| B | 0.005 | 2.1 |
| C | 0.01 | 1.9 |
| D | 0.02 | 1.6 |
| E | 0.04 | 0.74 |
| F | 0.06 | 0.51 |

The above tabled results indicated that the maximum tolerable percent sodium in the monobasic cadmium caprate preparations is approximately 0.04%, with a preferred maximum of sodium of about 0.01%. As is evident, Composition F, monobasic cadmium caprate prepared by metathesis, having a volume resistivity of $0.51 \times 10^{12}$ ohm-cm., is far below the level of Composition E which contains the maximum tolerable percent Na. It may be noted that the absolute values of the volume resistivity will vary with the particular formulation, processing and test conditions used, but in any event, the stabilizers contemplated in the instant invention are superior to the heretofore known stabilizers.

By the term "vinyl halide resin" we mean to include the various vinyl resin compounds and combinations known to the art, including vinyl halides such as polyvinyl chloride; vinyl resins produced by copolymerizing a vinyl halide with a vinyl acetate or other vinyl esters; vinyl resins produced by copolymerization with an acrylic compound such as ethyl or methyl methacrylate; vinylidene halides, and vinyl-vinylidene halide copolymers.

The foregoing examples illustrate specific embodiments of the instant invention. It is apparent that the vinyl resin compositions employing our novel invention have been greatly improved with respect to clarity and electrical resistivity. A variety of plasticizers, coloring agents, clays, fillers, and modifying agents may also be employed in these compositions as will be understood by those skilled in the art.

While this invention has been described and illustrated by examples, it is not intended to be strictly limited thereto and other modifications may be employed within the limits of the following claims.

We claim:

1. A method of producing a basic cadmium compound corresponding to the formula $CdO \cdot Cd(C_nH_{2n+1}COO)_2$, where $n$ represents an integer of from 3 to 21, which comprises mixing a cadmium compound selected from the group consisting of cadmium oxide and cadmium hydroxide and an aliphatic carboxylic acid containing from 4 to 22 carbon atoms in an aqueous medium containing a water soluble organic compound selected from the group consisting of alcohols and glycol ethers, and mixing the same until the cadmium compound and the aliphatic carboxylic acid are chemically combined.

2. A method of producing a basic cadmium compound which comprises mixing from 1.5 to 2 moles of a cadmium compound selected from the group consisting of cadmium oxide and cadmium hydroxide and 2 moles of an unsubstituted aliphatic monocarboxylic acid containing from 4 to 22 carbon atoms in an aqueous medium containing a water soluble organic compound, and mixing the same at a temperature of between 30° C. and 100° C. until the cadmium compound and the aliphatic monocarboxylic acid are chemically combined.

3. A method of producing a basic cadmium compound which comprises the steps of mixing from 1.5 to 2 moles of a cadmium compound selected from the group consisting of cadmium oxide and cadmium hydroxide and 2 moles of an unsubstituted aliphatic monocarboxylic acid containing from 4 to 22 carbon atoms and mixing the same until the cadmium compound and the aliphatic monocarboxylic acid are chemically combined.

4. A method of producing a basic cadmium compound which comprises the steps of mixing from 1.5 to 2 moles of a cadmium compound selected from the group consisting of cadmium oxide and cadmium hydroxide and 2 moles of an unsubstituted aliphatic monocarboxylic acid containing from 4 to 22 carbon atoms in an aqueous medium containing a water soluble organic compound selected from the group consisting of alcohols and glycol ethers, and mixing the same until the cadmium compound and the aliphatic monocarboxylic acid are chemically combined.

5. A method of producing a basic cadmium compound which comprises the steps of mixing from 1.5 to 2 moles of a cadmium compound selected from the group consisting of cadmium oxide and cadmium hydroxide and 2 moles of an unsubstituted aliphatic monocarboxylic acid containing from 4 to 22 carbon atoms in an aqueous medium containing a water soluble organic compound, said water soluble organic compound being isobutanol, and mixing the same until the cadmium compound and the aliphatic monocarboxylic acid are chemically combined.

6. A method of producing a basic cadmium compound which comprises mixing from 1.5 to 2 moles of a cadmium compound selected from the group consisting of cadmium oxide and cadmium hydroxide and 2 moles of an unsubstituted aliphatic monocarboxylic acid containing from 4 to 22 carbon atoms in an aqueous medium containing a water soluble organic compound, said water soluble organic compound being ethylene glycol monobutyl ether, and mixing the same until the cadmium compound and the aliphatic monocarboxylic acid are chemically combined.

References Cited by the Examiner

UNITED STATES PATENTS

| | | | |
|---|---|---|---|
| 2,261,611 | 11/1941 | Young et al. | 260—23 |
| 2,564,646 | 8/1951 | Leistner et al. | 260—45.75 |
| 2,650,932 | 9/1953 | Kebrich et al. | 260—414 |
| 2,671,064 | 3/1954 | Cowell et al. | 260—23 |
| 2,711,401 | 6/1955 | Lally | 260—45.75 |
| 2,752,319 | 6/1956 | Lipke et al. | 260—45.75 |
| 2,801,988 | 8/1957 | Fischer et al. | 260—45.75 |
| 2,890,232 | 6/1959 | Rogers et al. | 260—414 |
| 2,945,051 | 7/1960 | Davis | 260—414 |
| 3,002,943 | 10/1961 | Kebrich | 260—45.75 |

CHARLES B. PARKER, *Primary Examiner.*

ABRAHAM RIMENS, MILTON STERMAN, LEON J. BERCOVITZ, *Examiners.*